(12) United States Patent     (10) Patent No.:   US 12,587,089 B2
Graves     (45) Date of Patent:      Mar. 24, 2026

(54) FREQUENCY TUNED RESISTOR-INDUCTOR-CAPACITOR SNUBBER FOR SWITCHING POWER SUPPLY

(71) Applicant: L3Harris Technologies, Inc., Melbourne, FL (US)

(72) Inventor: Justin Malcom Graves, Middletown, OH (US)

(73) Assignee: L3Harris Technologies, Inc., Melbourne, FL (US)

( * ) Notice: Subject to any disclaimer, the term of this patent is extended or adjusted under 35 U.S.C. 154(b) by 305 days.

(21) Appl. No.: 18/481,369

(22) Filed: Oct. 5, 2023

(65) Prior Publication Data

US 2025/0119052 A1      Apr. 10, 2025

(51) Int. Cl.
H02M 1/34       (2007.01)
H02M 3/335     (2006.01)

(52) U.S. Cl.
CPC ....... H02M 1/346 (2021.05); H02M 3/33507 (2013.01)

(58) Field of Classification Search
CPC ... H02M 1/346; H02M 1/348; H02M 3/33507
USPC ........................................................ 363/123
See application file for complete search history.

(56) References Cited

U.S. PATENT DOCUMENTS

| | | | |
|---|---|---|---|
| 6,519,164 B1 * | 2/2003 | Weng .................... | H02M 3/335 |
| | | | 363/21.04 |
| 6,532,160 B2 * | 3/2003 | Hirokawa ............... | H02M 1/34 |
| | | | 363/52 |
| 6,980,447 B1 * | 12/2005 | Schaible ........... | H02M 3/33592 |
| | | | 363/56.05 |
| 11,646,652 B1 * | 5/2023 | Graves .............. | H02M 3/33576 |
| | | | 363/13 |
| 2009/0154204 A1 * | 6/2009 | Taylor ............... | H02M 3/33592 |
| | | | 363/52 |
| 2015/0055374 A1 * | 2/2015 | Yamashita .............. | H02M 3/01 |
| | | | 363/17 |
| 2017/0170735 A1 * | 6/2017 | Yang ................. | H02M 3/33507 |
| 2022/0399804 A1 * | 12/2022 | Rehlaender ....... | H02M 3/33538 |

* cited by examiner

*Primary Examiner* — Yemane Mehari
(74) *Attorney, Agent, or Firm* — Edell, Shapiro & Finnan, LLC

(57) ABSTRACT

A power supply comprises: a transformer having a secondary winding to produce an alternating current at terminals of the secondary winding responsive to a switching current in a primary winding of the transformer; an output rectifier, coupled to the terminals and to an output node and a return node of the output rectifier to be connected to a load, including at least a first diode to rectify the alternating current and to supply a rectified current to the output node; and a first resistor (R)-inductor (L)-capacitor (C) (RLC) snubber (first RLC snubber) including a first resistor, a first inductor, and a first capacitor connected in series with each other, the first RLC snubber coupled to the output rectifier and the secondary winding to dampen voltage ringing in the output rectifier caused by the switching current.

19 Claims, 8 Drawing Sheets

800

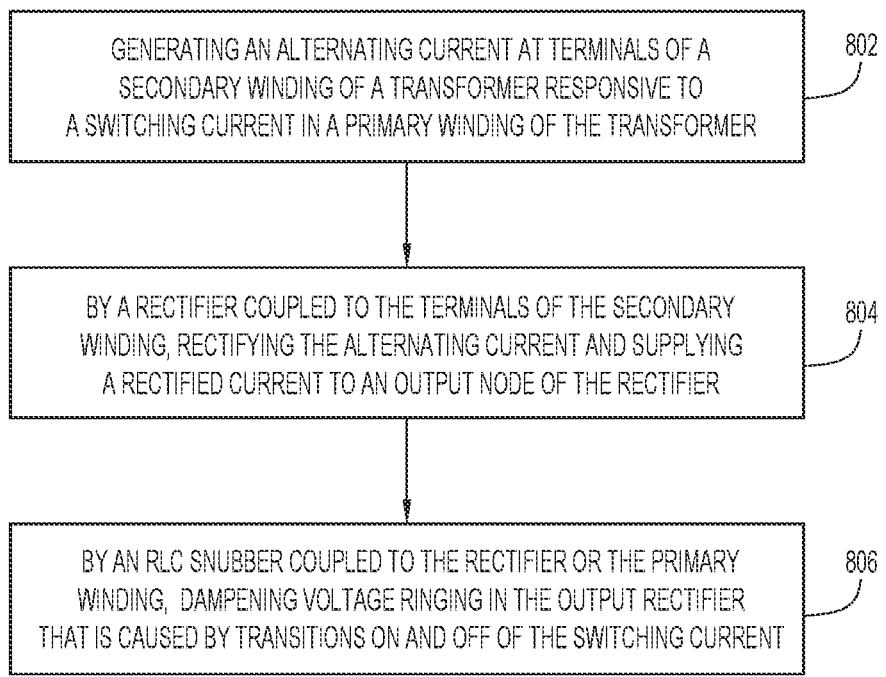

GENERATING AN ALTERNATING CURRENT AT TERMINALS OF A
SECONDARY WINDING OF A TRANSFORMER RESPONSIVE TO
A SWITCHING CURRENT IN A PRIMARY WINDING OF THE TRANSFORMER
802

BY A RECTIFIER COUPLED TO THE TERMINALS OF THE SECONDARY
WINDING, RECTIFYING THE ALTERNATING CURRENT AND SUPPLYING
A RECTIFIED CURRENT TO AN OUTPUT NODE OF THE RECTIFIER
804

BY AN RLC SNUBBER COUPLED TO THE RECTIFIER OR THE PRIMARY
WINDING, DAMPENING VOLTAGE RINGING IN THE OUTPUT RECTIFIER
THAT IS CAUSED BY TRANSITIONS ON AND OFF OF THE SWITCHING CURRENT
806

FIG.8

FREQUENCY TUNED RESISTOR-INDUCTOR-CAPACITOR SNUBBER FOR SWITCHING POWER SUPPLY

TECHNICAL FIELD

The present disclosure relates to frequency-tuned snubbers for switching power supplies.

BACKGROUND

A switching power supply includes an output rectifier to convert an alternating current (AC) signal to a direct current (DC) signal. Parasitic circuit parameters cause undesired voltage stress and ringing across the output rectifier. The voltage stress drives the use of higher voltage rated rectifiers, which have a higher forward voltage drop than lower voltage rated rectifiers. The higher forward voltage drop dissipates more power, disadvantageously reducing power supply efficiency. The voltage ringing causes undesired radiated electromagnetic interference (EMI). Conventional resistor-capacitor (RC) snubbers may be added to the output rectifier to reduce the voltage stress and ringing. Disadvantageously, the RC snubbers are untuned with respect to frequency and therefore attenuate voltage ringing across an unnecessarily wide frequency range, which dissipates too much heat and reduces power supply efficiency. Moreover, the RC snubbers cannot normally dampen the voltage ringing completely unless they are adjusted to dissipate more heat than desired.

BRIEF DESCRIPTION OF THE DRAWINGS

FIG. 8 is a flowchart of an example method of dampening or suppressing voltage ringing in a switching power supply system.

DESCRIPTION OF EXAMPLE EMBODIMENTS

Overview

In an embodiment, a power supply comprises: a transformer having a secondary winding to produce an alternating current at terminals of the secondary winding responsive to a switching current in a primary winding of the transformer; an output rectifier, coupled to the terminals and to an output node and a return node of the output rectifier to be connected to a load, including at least a first diode to rectify the alternating current and to supply a rectified current to the output node; and a first resistor (R)-inductor (L)-capacitor (C) (RLC) snubber (first RLC snubber) including a first resistor, a first inductor, and a first capacitor connected in series with each other, the first RLC snubber coupled to the output rectifier and the secondary winding to dampen voltage ringing in the output rectifier caused by the switching current.

Example Embodiments

Figure 1:
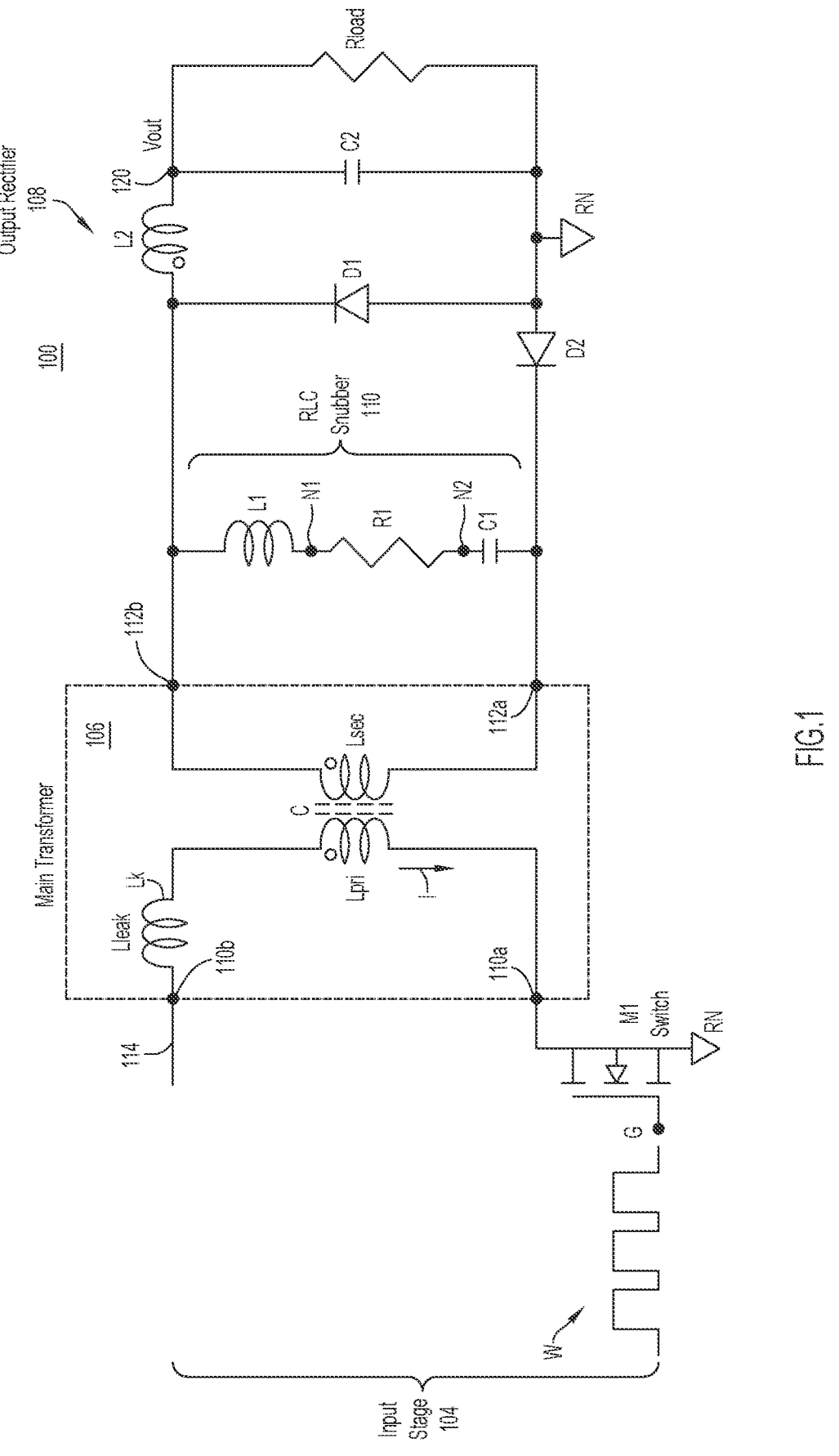
FIG. 1 is a circuit diagram of an example switching power supply system (also referred to simply as a "power supply") configured as a forward converter that employs a resistor (R)-inductor (L)-capacitor (C) (RLC) snubber.

FIG. 1 is a circuit diagram of an example switching power supply system 100 (also referred to as a "switching power supply" or simply as a "power supply") configured as a forward converter that employs an RLC snubber according to an embodiment. Switching power supply system 100 includes an input stage 104, a transformer 106 coupled to the input stage, and an output rectifier 108 (also referred to as a "rectifier circuit") coupled to the transformer. Input stage 104 applies a switched input current I to transformer 106 under control of a transistor switch M1. Transformer 106 transforms the switched input current to an alternating current (AC) waveform or signal (including current and voltage). Output rectifier 108 rectifies the AC signal and supplies a rectified current and voltage to an output load Rload coupled to the output rectifier. Additionally, switching power supply system 100 includes an RLC snubber 110 coupled to output rectifier 108 to dampen voltage peaking and ringing in the output rectifier caused by the switching current, according to embodiments presented herein. As used herein, the term "coupled to" (and similarly "connected to"), unless specified otherwise, covers an arrangement in which components or terminals/nodes are directly connected to each other, and an arrangement in which the components or terminals/nodes are indirectly connected to each other through one or more intermediate components.

Transformer 106 includes (i) a primary winding Lpri (also referred to as an "input winding") having a first terminal 110a and a second terminal 110b coupled to input stage 104, and (ii) a secondary winding Lsec (also referred to as an "output winding") having a first terminal 112a and a second terminal 112b coupled to output rectifier 108 as input terminals to the output rectifier, and (iii) a magnetic core C to couple the primary winding to the secondary winding. A leakage inductance of transformer 106 is modeled by an inductor Lk coupled to second terminal 110b of transformer 106.

Input stage 104 includes a voltage rail 114 coupled to terminal 110b of transformer 106, and switch transistor M1 (which serves as a current switch) coupled to terminal 110a. Voltage rail 114 applies a constant voltage to terminal 110b, and supplies or sources input current I (also referred to as a "transformer primary current" or a "transformer input current") to primary winding Lpri under control of switch transistor M1 (also referred to as a "current switch" or simply as a "switch"). Specifically, switch M1 includes a controlled current path (i.e., a source-drain (S-D) path) coupled between terminal 110a of primary winding Lpri and a return node RN of switching power supply system 100, such that the controlled current path and the primary winding are connected in series with each other between voltage rail 114 and the return node. When ON, switch M1 sinks input current I from voltage rail 114 through primary winding Lpri, and when OFF, the switch blocks the input current, i.e., I=0. That is, when switch M1 is ON, current flows through the switch and primary winding Lpri, i.e., the current is also ON. When switch M1 is OFF, current does not flow through the switch and primary winding Lpri, i.e., the current is OFF. Therefore, switching M1 ON and OFF produces a switching current that switches ON and OFF (i.e., that is flowing and is not flowing, respectively). Primary winding Lpri is said to receive the switching current produced by switch M1. In an example, switch M1 is a field effect transistor (FET), or any other type of transistor suited for current switching as described herein.

Switch M1 (and thus input current I) is switched ON and OFF responsive to a cyclic or periodic waveform W (also referred to as a "pulse train") applied to a control terminal G (e.g., a gate) of the switch. Waveform W is configured to turn ON switch M1 (and input current I) for a first time period and to turn OFF the switch (and the input current) for a second time period following the first time period. Together, the consecutive first and second time periods represent one switching cycle or one period of waveform W (and thus input current I), which establishes the following input current operation:

1. At the start of the first time period, switch M1 transitions (i.e., switches or cycles) from OFF to ON (referred to as an "OFF-ON transition") and remains ON for the first time period. In response, input current I correspondingly transitions from OFF to ON (i.e., starts flowing) at the start of the first time, and remains ON for the first time period.

2. At the start of the second time period, switch M1 transitions from ON to OFF (referred as an "ON-OFF transition") and remains OFF for the second time period. In response, input current I correspondingly transitions from ON to OFF (i.e., stops flowing) at the start of the second time period, and remains OFF for the second time period. The cycle (a) then (b) repeats.

Responsive to the switching of input current I in primary winding Lpri, secondary winding Lsec generates or produces an AC signal (including voltage and current) at/across terminals 112a and 112b of the secondary winding. The AC signal (also referred to as a "transformer secondary AC signal" or a "transformer output AC signal") is cyclical with a periodicity corresponding to that of input current I. As used herein the term "AC signal" refers generally to one or more AC signals or waveforms generated by secondary winding Lsec and applied across rectifier diodes (described below) of output rectifier 108. The AC signal includes undesired high-level voltage transients or "spikes" (also referred to as "voltage peaking" above) followed by undesired sinusoidal voltage ringing that decays over time. The voltage spikes coincide with the above-mentioned ON/OFF transitions or switching of input current I. The voltage spikes and ringing have magnitudes that exceed a plateau of the AC signal that follows the voltage ringing. Output rectifier 108 rectifies and smooths the AC signal, to supply a rectified current and voltage Vout to output load Rload through an output node 120 of the output rectifier that is coupled to the output load. In addition, RLC snubber 110 substantially dampens the voltage peaking and ringing in output rectifier 108 caused by the switching current and thus reduces the effect of the voltage ringing on the output rectifier. As a result, RLC snubber 110 has lower peak voltage stress and substantially reduces EMI compared to conventional snubbers.

Output rectifier 108 includes output load Rload coupled to output node 120 and return node RN (i.e., across the output node and the return node), an output capacitor C2 coupled to the output node and the return node, (i.e., across the output load), and an inductor L2 coupled to and between terminal 112b and the output node, and through which a rectified current flows. That is, terminal 112b is coupled to output node 120 through inductor L2. Output rectifier 108 also includes back-to-back rectifier diodes including diode D1 and diode D2 (also referred to simply as "rectifiers") to rectify first and second AC signal components of the AC signal that occur across diodes D1 and D2, respectively, to produce the rectified current. Diode D1 has a cathode and an anode connected to terminal 112a (i.e., the non-dot terminal) and return node RN, respectively. Diode D2 has a cathode and an anode connected to terminal 112b (i.e., the dot terminal) and return node RN, respectively. Thus, both diodes D1 and D2 have respective anodes connected back-to-back and to return node RN. Generally, (i) diode D2 operates to supply the rectified current and voltage Vout to output node 120 when the input current I is ON in primary winding Lpri during the first time period, and (ii) diode D1 operates to supply the rectified current and voltage Vout to the output node 120 when the input current is OFF in the primary winding during the second time period. Output capacitor C2 accumulates charge during rectifier cycles to help smooth rectified voltage Vout.

RLC snubber 110 includes an inductor L1, a resistor R1, and a capacitor C1 connected in series with each other to and between opposing end terminals of the RLC snubber that are respectively connected to terminals 112a and 112b. That is, RLC snubber 110 is connected across terminals 112a and 112b to be connected in parallel with secondary winding Lsec. More specifically, inductor L1 has its first and second opposing ends respectively connected to terminal 112b and a first intermediate node N1 of RLC snubber 110, resistor R1 has its first and second opposing ends respectively connected to first intermediate node N1 and a second intermediate node N2 of the RLC snubber, and capacitor C1 has its first and second opposing ends respectively connected to the second intermediate node and to terminal 110a. Inductor L1, resistor R1, and capacitor C1 may be individual circuit components, as shown in FIG. 1. In another arrangement, the RLC snubber may include inductor L1 and capacitor C1 as individual circuit components, while resistor R1 represents an internal resistance of the inductor. That is, the RLC snubber does not include an individual resistor.

In operation, repeated switching cycles of input current I in primary winding Lpri correspondingly produce cycles of the AC signal at terminals 112a and 112b of secondary winding Lsec. The AC signal includes the above-mentioned undesired high-level voltage transients and ringing caused by the switching transitions of input current I. The voltage transients include (i) a first voltage transient and ringing that occur at terminal 112a each time input current I transitions from ON to OFF (i.e., is switched OFF) in primary winding Lpri, and (ii) a second voltage transient and ringing that occur at terminal 112b each time the input current transitions from OFF to ON (i.e., is switched ON) in the primary winding. The first voltage transient and ringing occurs across diode D1 when diode D2 is conducting, and the second voltage transient and ringing occurs across diode D2 when diode D1 is conducting.

RLC snubber 110 equally dampens the voltage transient/peaking and ringing that occurs across each of rectifier diodes RD1, RD2 in each of the switching cases mentioned above. Values of an inductance L of inductor L1 and a capacitance C of capacitor C1 are predetermined/selected to establish or set a resonant frequency $f_R$ of the RLC snubber that is tuned to a natural voltage ringing frequency $f_N$ that occurs in output rectifier 108 when the RLC snubber is absent. Therefore, L1 and C1 of RLC snubber 110 form a tank circuit tuned to natural voltage ringing frequency $f_R$. The product of the values of inductance L and capacitance C (LC) is given by: $f_N=1/(2\pi\sqrt{(LC)})$. The values of inductance L and capacitor C may be predetermined using the following a priori operations, for example:

1. An operator measures or determines natural resonant frequency $f_N$ of output rectifier 108 with RLC snubber electrically isolated from the output rectifier using any known or hereafter developed technique, i.e., when the RLC snubber is not installed in the output rectifier. For example, using an oscilloscope, the operator captures waveforms of voltage ringing at terminals 112a, 112b while switching power supply system 100 operates without the RLC snubber, and then measure natural frequency $f_N$ of the voltage ringing.

2. The operator selects inductance L and capacitance C so that their product satisfies the equation cited above based on the measured frequency $f_N$.

Figure 2:
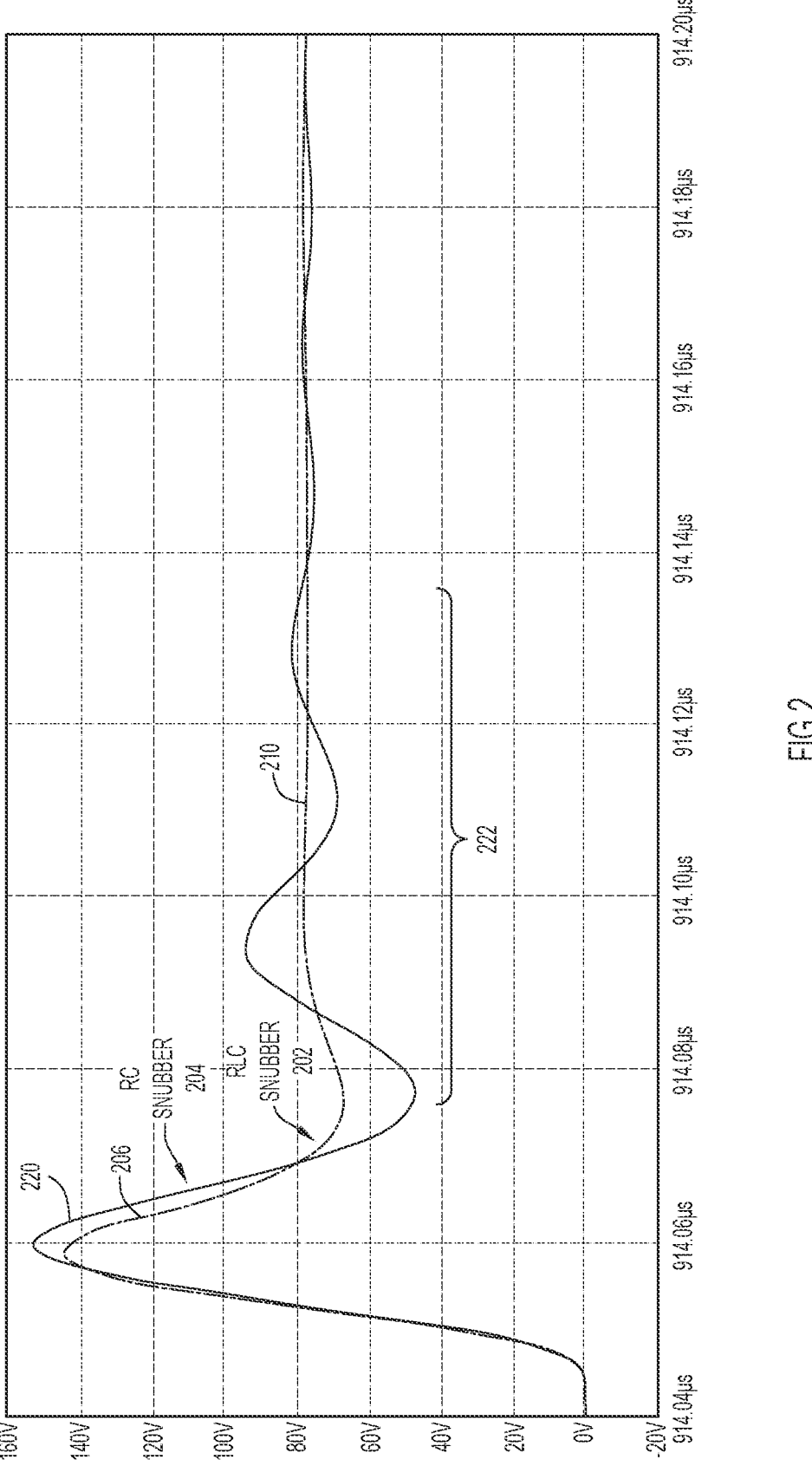
FIG. 2 shows an example comparison voltage waveforms for an AC signal in an output rectifier of the switching power supply system when the RLC snubber is installed and when the RLC snubber is not installed and is replaced by a resistor-capacitor (RC) snubber.

FIG. 2 shows an example voltage waveform 202 for an AC signal in output rectifier 108 when RLC snubber is present, and an example comparison voltage waveform 204 for the AC signal when a conventional RC snubber is used in place of the RLC snubber. Voltage waveforms 202 and comparison voltage waveform 204 are represented/plotted against example voltage and time scales. When the RLC snubber is present, voltage waveform 202 takes the form of a voltage pulse that occurs across one of didoes D1 and D2 depending on the timing of the switching cycle. The voltage pulse includes a high-level voltage transient 206 (i.e., voltage peaking) that decays down to a plateau 210 of the voltage pulse over a relatively short period of time, without any noticeable voltage ringing. The RLC snubber reduces the voltage peaking and substantially eliminates the voltage ringing.

In contrast, when the conventional RC snubber is used in place of the RLC snubber, comparison voltage waveform 204 includes a high level voltage transient 220 followed by substantial sinusoidally varying voltage ringing 222 that has a magnitude that decays slowly toward plateau 224. Thus, the RLC snubber significantly reduces the voltage peaking and ringing in output rectifier 108 compared to when the RLC snubber is not present and compared to the RC snubber. Moreover, tuned resonant frequency $f_R$ of the RLC snubber selectively targets voltage ringing at natural frequency $f_N$ and thus resistor R1 only dissipates power in a selective frequency band centered on the ringing frequency.

Additional embodiments that use the RLC snubber or multiple such RLC snubbers are described below in connection with FIG. 3-6.

Figure 3:
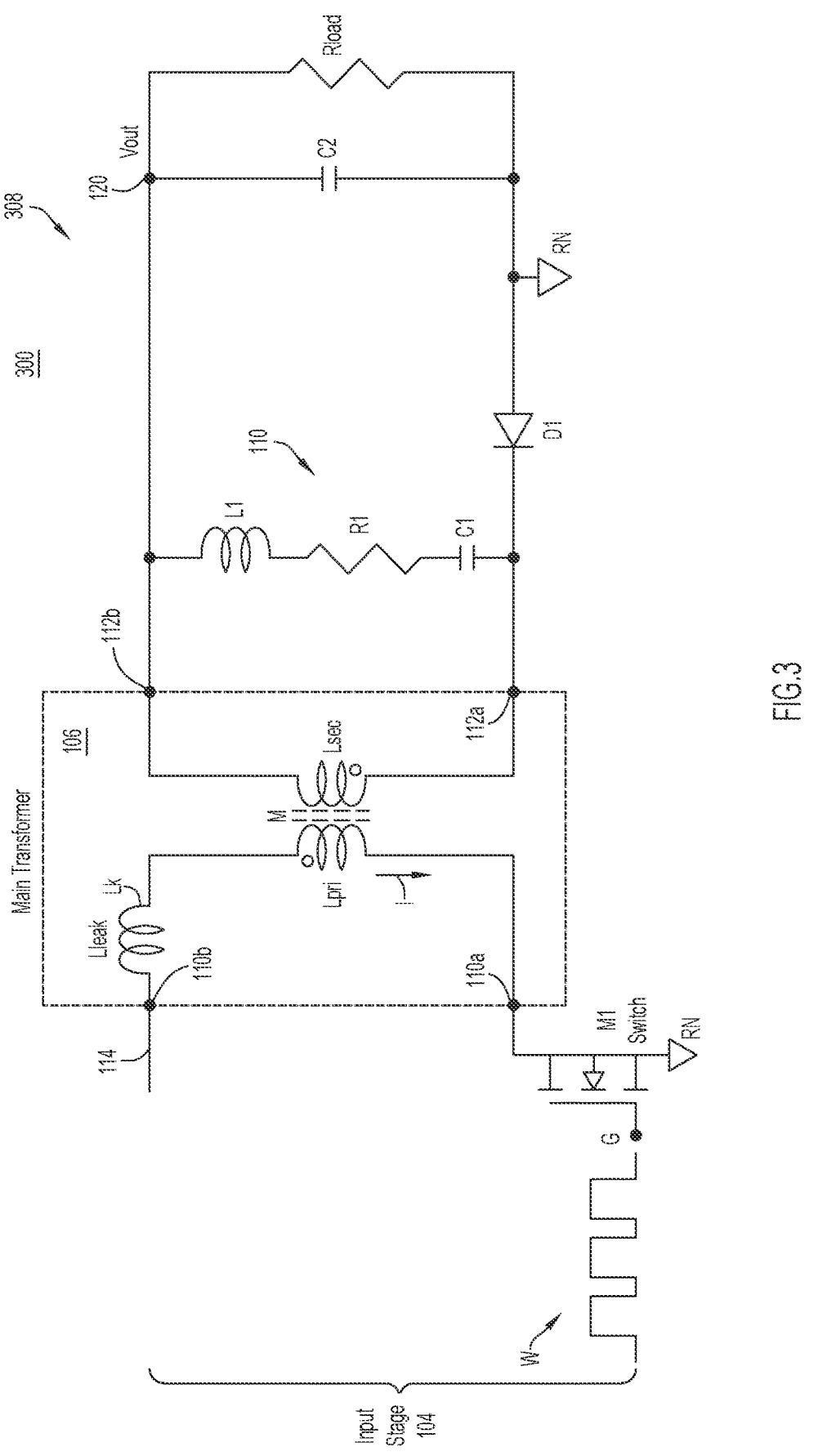
FIG. 3 is a circuit diagram of an example switching power supply system configured as a flyback converter that employs the RLC snubber across a secondary winding of the switching power supply system.

FIG. 3 is a circuit diagram of an example switching power supply system 300 configured as a flyback converter that employs RLC snubber 110 across secondary winding Lsec. Switching power supply system 300 includes input stage 104 and an output rectifier 308 that is similar to output rectifier 108, except that inductor L2 is omitted and diode D1 is used in place of (i.e., replaces) diode D2, leaving only diode D1 and capacitor C2 across load Rload. Switching power supply system 300 includes RLC snubber 110 connected across secondary winding Lsec, similar to the arrangement of switching power supply system 100.

Figure 4:
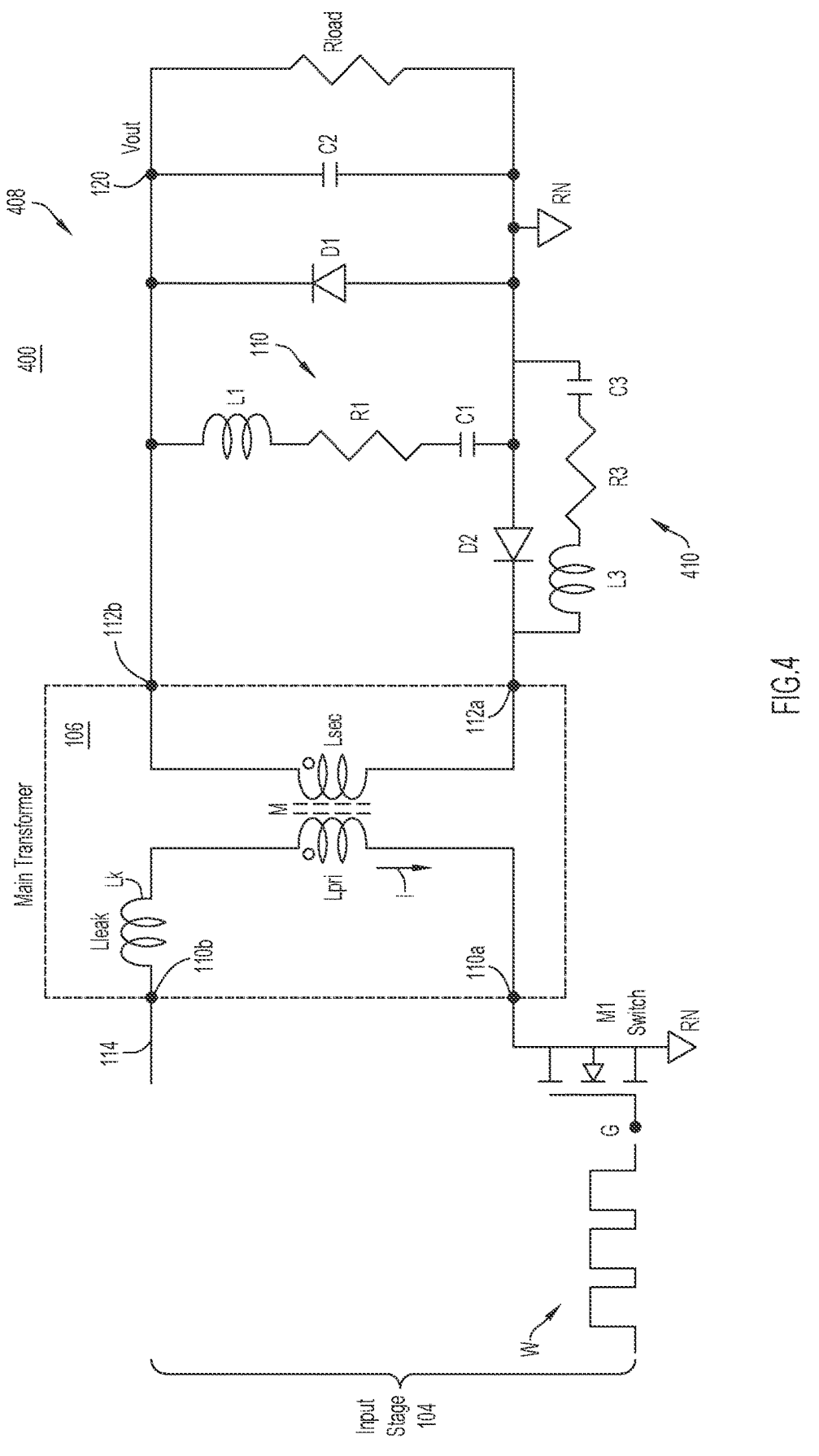
FIG. 4 is a circuit diagram of an example switching power supply system configured as a forward converter that employs multiple RLC snubbers.

FIG. 4 is a circuit diagram of an example switching power supply system 400 configured as a forward converter similar to switching power supply system 100, and that employs multiple RLC snubbers. Switching power supply system 400 includes input stage 104 and an output rectifier 408 configured similarly to output rectifier 108. Switching power supply system 400 includes (i) RLC snubber 110 (i.e., a first RLC snubber) repositioned slightly to be connected across (i.e., in parallel with) diode D1, i.e., the RLC snubber includes opposing first and second end terminals respectively connected to return node RN and terminal 112b, and (ii) an RLC snubber 410 (i.e., a second RLC snubber) connected across (i.e., in parallel with) diode D2, i.e., the second RLC snubber includes opposing first and second end terminals respectively connected to the anode and the cathode of diode D2. RLC snubber 410 includes inductor L3, resistor R3, and capacitor C3 connected in series to and between the opposing first and second end terminals of the RLC snubber, similar to the configuration of RLC snubber 110. The values of an inductance of inductor L3 and a capacitance of capacitor C3 are selected as described above.

Figure 5:
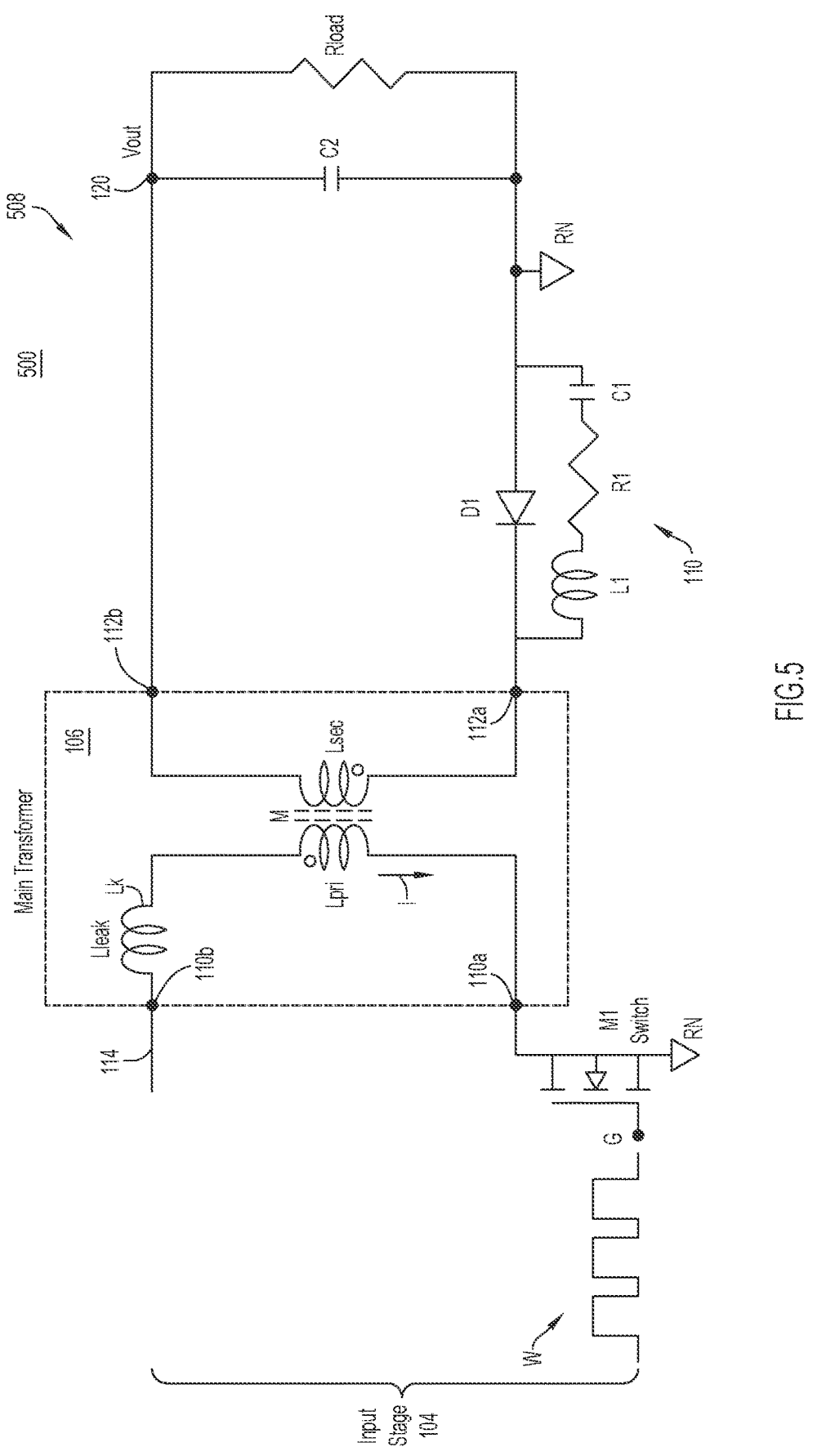
FIG. 5 is a circuit diagram of an example switching power supply system configured as a flyback converter that employs the RLC snubber across a rectifier diode of an output rectifier of the switching power supply system.

FIG. 5 is a circuit diagram of an example switching power supply system 500 configured as a flyback converter similar to switching power supply system 300 and that employs RLC snubber 110 repositioned to be connected across D1. More specifically, switching power supply system 500 includes input stage 104, an output rectifier 508 similar to output rectifier 308, except that RLC snubber 110 is connected across diode D1.

Figure 6:
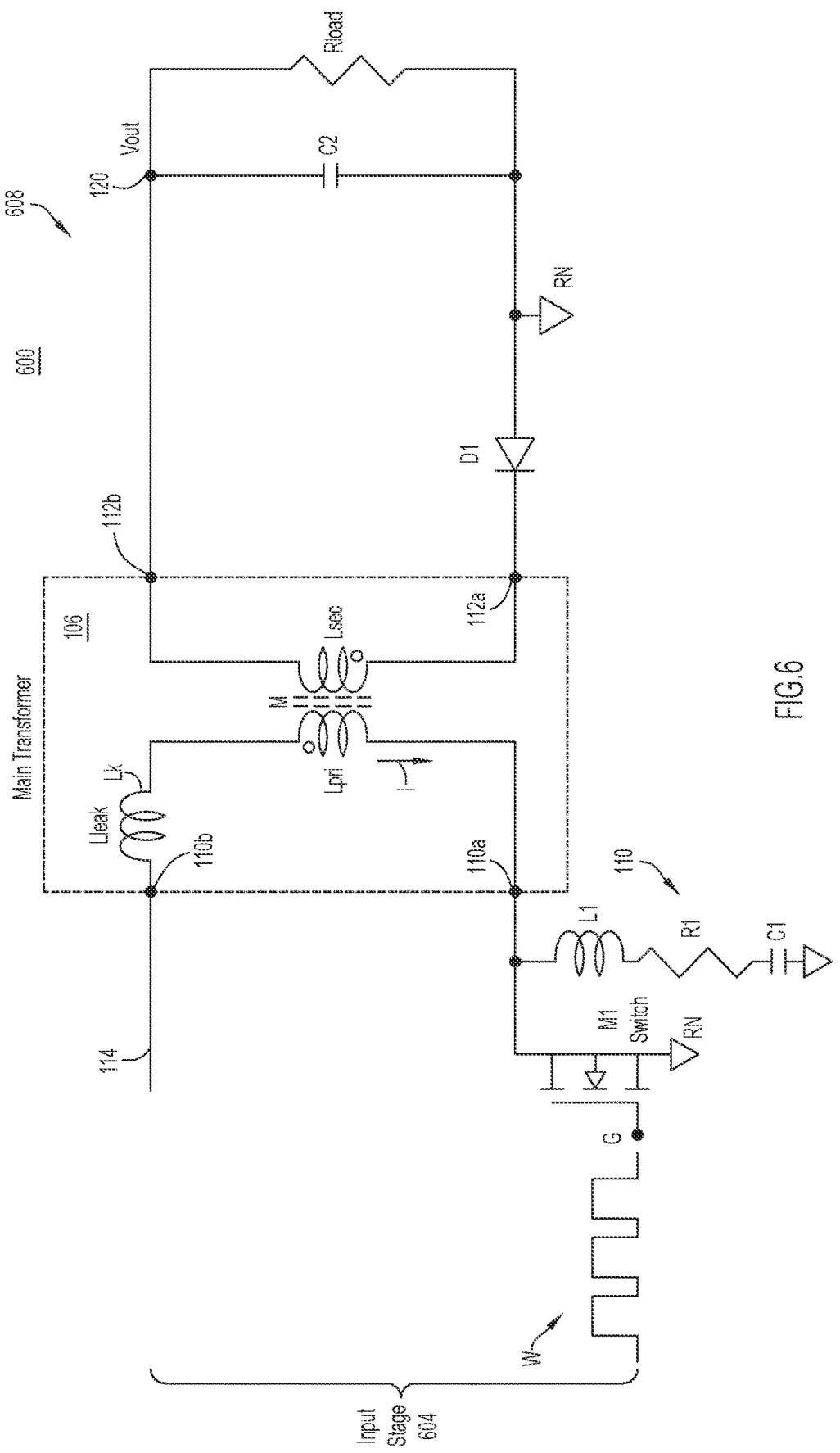
FIG. 6 is a circuit diagram of an example switching power supply system configured as a flyback converter that has an input stage that employs the RLC snubber.

FIG. 6 is a circuit diagram of an example switching power supply system 600 configured as a flyback converter having an input stage 604 that employs RLC snubber 110, and an output rectifier 608 coupled to the input stage. More specifically, input stage 604 is configured similarly to input stage 104, except that RLC snubber 110 is repositioned to be connected across the source-drain path of switch M1, between terminal 110a and return node RN. In this configuration, RLC snubber 110 dampens voltage peaking and ringing on the drain of M1, e.g., on the current switch. The values of inductance L and capacitance C are predetermined/selected to establish or set the resonant frequency $f_R$ of RLC snubber 110 that is tuned to the natural voltage ringing frequency $f_N$ that occurs on the drain of switch M1 when the RLC snubber is absent.

Figure 7:
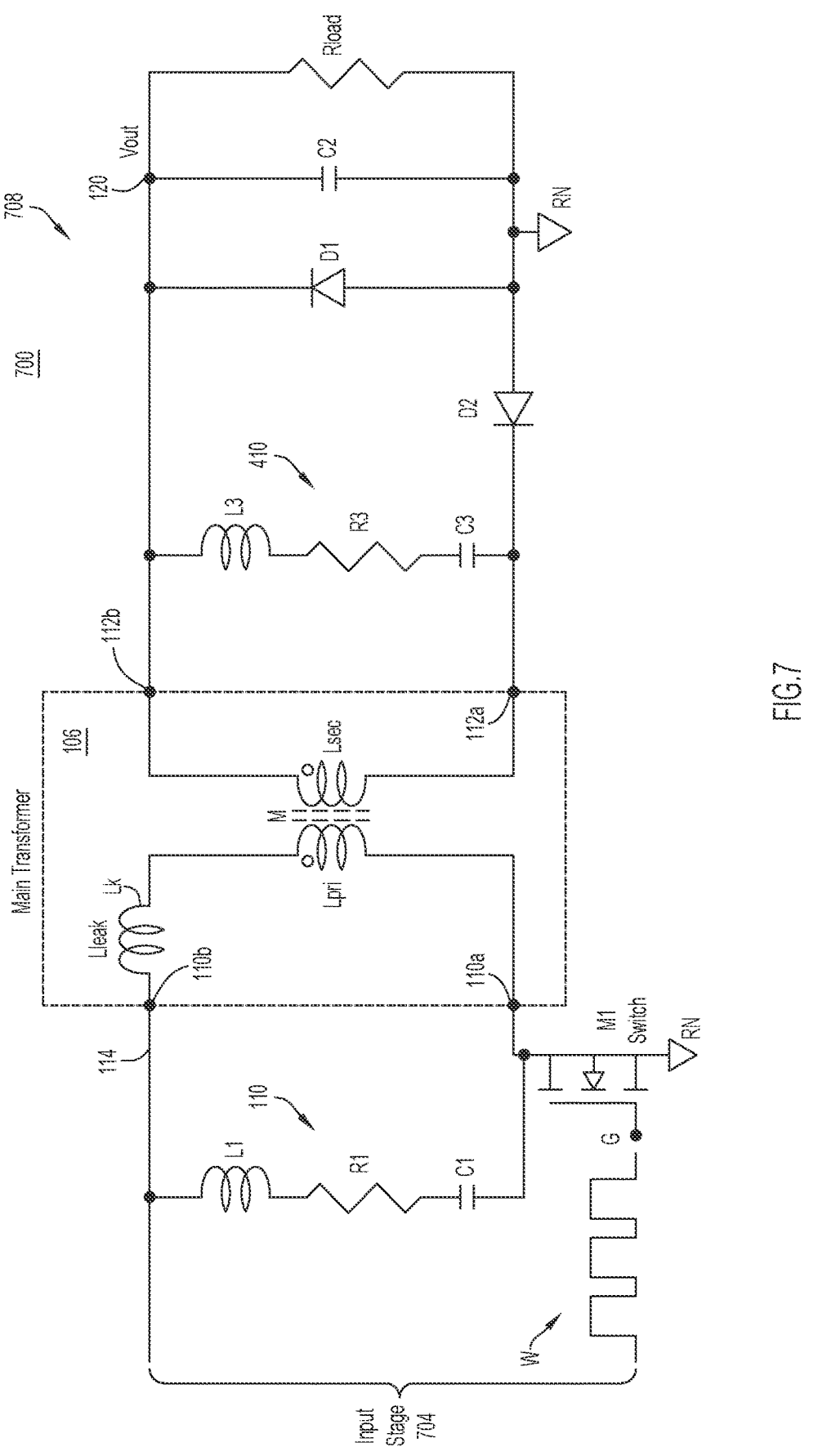
FIG. 7 is a circuit diagram of an example switching power supply system configured as a forward converter having an input stage that employs a first RLC snubber, and an output rectifier that employs a second RLC snubber.

FIG. 7 is a circuit diagram of an example switching power supply system 700 configured as a forward converter having an input stage 704 that employs RLC snubber 110, and an output rectifier 708 coupled to the input stage and that optionally employs RLC snubber 410. Input stage 704 is configured similarly to input stage 104, except that RLC snubber 110 is repositioned to be connected in series with the source-drain path of switch M1 between voltage rail 114 and return node RN. That is, the opposing first and second end terminals of RLC snubber 110 are respectively connected to the source-drain path of switch M1 and voltage rail 114. In addition, switching power supply system 700 includes RLC snubber 410 connected in parallel with secondary winding Lsec, similar to switching power supply system 100.

Variations of the embodiments described above are possible. The embodiments may include a single RLC snubber coupled to the current switch as described above to dampen voltage peaking and ringing on the current switch, but no RLC snubber coupled to the output rectifier. The embodiments may include a single RLC snubber coupled to the output rectifier as described above to dampen voltage peaking and ringing in the output rectifier, but no RLC snubber coupled to the current switch. The embodiments may include multiple RLC snubbers including a first RLC snubber coupled to the current switch and a second RLC snubber coupled to the output rectifier. In other embodiments, multiple RLC snubbers may be connected to each of the current switch and/or the output rectifier.

An RLC snubber component selection process is presented below.

1. With no snubber (RLC or otherwise) in place, measure the natural voltage ringing frequency across any two circuit nodes/terminals where ringing suppression is desired (e.g., in the input stage or the output rectifier).
    a. For example, from drain-to-source on switch M1 in a flyback converter.
    b. Assume a 28 MHz ringing frequency.
2. Select either a capacitance or an inductance as a design starting point.
    a. For this example, select a 1 μH inductance. Alternatively, select a capacitance.
    b. The physical capacitor or inductor chosen may be selected to have a self-resonant frequency above the natural voltage ringing frequency of interest.
3. Use (rearrange) the equation $1/(2\pi\sqrt{(LC)})$ to calculate the value of the remaining L or C component.
    a. For this example, the capacitance=$((1/(2\pi*f))^2)/L$= $((1/(2\pi*28\ \text{MHz}))^2)/1\ \mu H$=32.3 pF.
4. The selected LC may not be exactly tuned to the natural ringing frequency to be suppressed.
5. Select R to provide sufficient damping of the ringing waveform.
    a. Damping resistance can be tuned to reduce peak voltage stress to a desired level.
    b. Damping resistance can also be tuned to reduce radiated EMI, caused by circuit ringing, to a desired level.
    c. The damping resistor can also be tuned to provide significant ringing suppression, while keeping resistor power dissipation to a minimum, in order to preserve power supply efficiency and aid thermal control.

FIG. 8 is a flowchart of an example method 800 of dampening or suppressing voltage peaking and ringing in a switching power supply.

802 includes generating an alternating current at terminals of a secondary winding of a transformer responsive to a switching current in a primary winding of the transformer.

804 includes, by an output rectifier coupled to the terminals of the secondary winding, rectifying the alternating current and supplying a rectified current to an output node of the rectifier.

806 includes, by an RLC snubber coupled to the output rectifier or the primary winding, dampening voltage peaking and ringing in the output rectifier.

In summary, in some aspects, the techniques described herein relate to a power supply including: a transformer having a secondary winding to produce an alternating current at terminals of the secondary winding responsive to a switching current in a primary winding of the transformer; an output rectifier, coupled to the terminals and to an output node and a return node of the output rectifier to be connected to a load, including at least a first diode to rectify the alternating current and to supply a rectified current to the output node; and a first resistor (R)-inductor (L)-capacitor (C) (RLC) snubber (first RLC snubber) including a first resistor, a first inductor, and a first capacitor connected in series with each other, the first RLC snubber coupled to the output rectifier and the secondary winding to dampen voltage ringing in the output rectifier caused by the switching current.

In some aspects, the techniques described herein relate to a power supply, wherein: the first inductor and the first capacitor respectively have a first inductance and a first capacitance that set a first resonant frequency of the first RLC snubber that is tuned to a natural voltage ringing frequency that would occur in the output rectifier when the first RLC snubber is absent.

In some aspects, the techniques described herein relate to a power supply, wherein: the first resonant frequency of the first RLC snubber is given by 1/(2SYMBOLSYMBOL (LC)), where L is the first inductance and C is the first capacitance.

In some aspects, the techniques described herein relate to a power supply, wherein: the first resistor, the first inductor, and the first capacitor are individual circuit components.

In some aspects, the techniques described herein relate to a power supply, wherein: the first inductor and the first capacitor are individual components, and the first resistor includes a first internal resistance of the first inductor.

In some aspects, the techniques described herein relate to a power supply, wherein the first RLC snubber is connected across the terminals of the secondary winding so as to be connected in parallel with the secondary winding.

In some aspects, the techniques described herein relate to a power supply, wherein the first RLC snubber is connected in parallel with the first diode.

In some aspects, the techniques described herein relate to a power supply, wherein: a first terminal of the terminals of the secondary winding is connected to the return node through the first diode; and the first RLC snubber is connected in parallel with the first diode between the first terminal and the return node.

In some aspects, the techniques described herein relate to a power supply, wherein: the output rectifier includes a second diode coupled to a second terminal of the terminals and the return node so as to be connected in series with the first diode in a back-to-back arrangement between the return node and the terminals.

In some aspects, the techniques described herein relate to a power supply, wherein: a first terminal of the terminals of the secondary winding is connected to the return node through the first diode; wherein the output rectifier includes a second diode through which a second terminal of the terminals of the secondary winding is connected to the return node; and the first RLC snubber is connected in parallel with the second diode.

In some aspects, the techniques described herein relate to a power supply, further including: an output inductor through which a terminal of the terminals is connected to the output node.

In some aspects, the techniques described herein relate to a power supply, further including: a current switch having a current path coupled to the primary winding and configured to be switched ON and OFF cyclically to produce the switching current in the primary winding; and a second RLC snubber, including a second resistor, a second inductor, and a second capacitor, connected in series with each other and coupled to the current path of the current switch, to dampen voltage ringing on the current switch.

In some aspects, the techniques described herein relate to a power supply, wherein: the second inductor and the second capacitor respectively have a second inductance and a second capacitance that set a second resonant frequency of the second RLC snubber that is tuned to a frequency of natural voltage ringing that would occur on the current switch when the second RLC snubber is absent.

In some aspects, the techniques described herein relate to a power supply including: a transformer having a primary winding to receive a switching current and a secondary winding having terminals to produce an alternating current responsive to the switching current; a current switch having a current path coupled to the primary winding and configured to be switched ON and OFF cyclically to produce the switching current in the primary winding; an output rectifier coupled to the terminals of the primary winding and configured to rectify the alternating current to supply a rectified current to an output node of the output rectifier; and a first resistor (R)-inductor (L)-capacitor (C) (RLC) snubber (first RLC snubber), including a first resistor, a first inductor, and a first capacitor connected in series with each other and coupled to the current path of the current switch, to dampen voltage ringing on the current switch caused by the switching current.

In some aspects, the techniques described herein relate to a power supply, wherein: the first inductor and the first capacitor respectively have a first inductance and a first capacitance that set a first resonant frequency of the first RLC snubber that is tuned to a natural voltage ringing frequency that would occur on the current switch when the first RLC snubber is absent.

In some aspects, the techniques described herein relate to a power supply, wherein: the first resonant frequency of the first RLC snubber is given by $1/(2$SYMBOLSYMBOL$(LC))$, where L is the first inductance and C is the first capacitance.

In some aspects, the techniques described herein relate to a power supply, wherein: the first RLC snubber is connected in parallel with the current path of the current switch.

In some aspects, the techniques described herein relate to a power supply, wherein: the first RLC snubber is connected in series with the current path of the current switch.

In some aspects, the techniques described herein relate to a power supply, further including: a second RLC snubber including a second resistor, a second inductor, and a second capacitor connected in series with each other across the terminals to dampen voltage ringing in the output rectifier caused when the switching current switches ON or OFF.

In some aspects, the techniques described herein relate to a power supply, wherein: the second inductor and the second capacitor respectively have an inductance and a capacitance that set a resonant frequency of the second RLC snubber that is tuned to a natural voltage ringing frequency that would occur in the output rectifier when the second RLC snubber is absent.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A power supply comprising:
   a transformer having a secondary winding to produce an alternating current at terminals of the secondary winding responsive to a switching current in a primary winding of the transformer;
   an output rectifier, coupled to the terminals and to an output node and a return node of the output rectifier to be connected to a load, including at least a first diode to rectify the alternating current and to supply a rectified current to the output node; and
   a first resistor (R)-inductor (L)-capacitor (C) (RLC) snubber (first RLC snubber) including a first resistor, a first inductor, and a first capacitor connected in series with each other, the first RLC snubber coupled to the output rectifier and the secondary winding to dampen voltage ringing in the output rectifier caused by the switching current,
   wherein the first inductor and the first capacitor respectively have a first inductance and a first capacitance that set a first resonant frequency of the first RLC snubber that is tuned to a natural voltage ringing frequency that would occur in the output rectifier when the first RLC snubber is absent.

2. The power supply of claim 1, wherein:
   the first resonant frequency of the first RLC snubber is given by $1/(2\pi\sqrt{(LC)})$, where L is the first inductance and C is the first capacitance.

3. The power supply of claim 1, wherein:
   the first resistor, the first inductor, and the first capacitor are individual circuit components.

4. The power supply of claim 1, wherein:
   the first inductor and the first capacitor are individual components, and the first resistor includes a first internal resistance of the first inductor.

5. The power supply of claim 1, wherein the first RLC snubber is connected across the terminals of the secondary winding so as to be connected in parallel with the secondary winding.

6. The power supply of claim 1, wherein the first RLC snubber is connected in parallel with the first diode.

7. The power supply of claim 6, wherein:
   a first terminal of the terminals of the secondary winding is connected to the return node through the first diode; and
   and the first RLC snubber is connected in parallel with the first diode between the first terminal and the return node.

8. The power supply of claim 7, wherein:
   the output rectifier includes a second diode coupled to a second terminal of the terminals and the return node so as to be connected in series with the first diode in a back-to-back arrangement between the return node and the terminals.

9. The power supply of claim 1, wherein:
   a first terminal of the terminals of the secondary winding is connected to the return node through the first diode;
   wherein the output rectifier includes a second diode through which a second terminal of the terminals of the secondary winding is connected to the return node; and
   the first RLC snubber is connected in parallel with the second diode.

10. The power supply of claim 1, further comprising:
   an output inductor through which a terminal of the terminals is connected to the output node.

11. The power supply of claim 1, further comprising:
   a current switch having a current path coupled to the primary winding and configured to be switched ON and OFF cyclically to produce the switching current in the primary winding; and
   a second RLC snubber, including a second resistor, a second inductor, and a second capacitor, connected in series with each other and coupled to the current path of the current switch, to dampen the voltage ringing on the current switch.

12. The power supply of claim 11, wherein:

the second inductor and the second capacitor respectively have a second inductance and a second capacitance that set a second resonant frequency of the second RLC snubber that is tuned to a frequency of natural voltage ringing that would occur on the current switch when the second RLC snubber is absent.

13. A power supply comprising:

a transformer having a primary winding to receive a switching current and a secondary winding having terminals to produce an alternating current responsive to the switching current;

a current switch having a current path coupled to the primary winding and configured to be switched ON and OFF cyclically to produce the switching current in the primary winding;

an output rectifier coupled to the terminals of the primary winding and configured to rectify the alternating current to supply a rectified current to an output node of the output rectifier; and a first resistor (R)-inductor (L)-capacitor (C) (RLC) snubber (first RLC snubber), including a first resistor, a first inductor, and a first capacitor connected in series with each other and coupled to the current path of the current switch, to dampen voltage ringing on the current switch caused by the switching current, wherein the first inductor and the first capacitor respectively have a first inductance and a first capacitance that set a first resonant frequency of the first RLC snubber that is tuned to a natural voltage ringing frequency that would occur on the current switch when the first RLC snubber is absent.

14. The power supply of claim 13, wherein:

the first resonant frequency of the first RLC snubber is given by $1/(2\pi\sqrt{(LC)})$, where L is the first inductance and C is the first capacitance.

15. The power supply of claim 13, wherein:

the first RLC snubber is connected in parallel with the current path of the current switch.

16. The power supply of claim 13, wherein:

the first RLC snubber is connected in series with the current path of the current switch.

17. The power supply of claim 13, further comprising:

a second RLC snubber including a second resistor, a second inductor, and a second capacitor connected in series with each other across the terminals to dampen voltage ringing in the output rectifier caused when the switching current switches ON or OFF.

18. The power supply of claim 17, wherein:

the second inductor and the second capacitor respectively have an inductance and a capacitance that set a resonant frequency of the second RLC snubber that is tuned to a natural voltage ringing frequency that would occur in the output rectifier when the second RLC snubber is absent.

19. A power supply comprising:

a transformer having a secondary winding to produce an alternating current at terminals of the secondary winding responsive to a switching current in a primary winding of the transformer;

an output rectifier, coupled to the terminals and to an output node and a return node of the output rectifier to be connected to a load, including at least a first diode to rectify the alternating current and to supply a rectified current to the output node; and a first resistor (R)-inductor (L)-capacitor (C) (RLC) snubber (first RLC snubber) including a first resistor, a first inductor, and a first capacitor connected in series with each other, the first RLC snubber coupled to the output rectifier and the secondary winding to dampen voltage ringing in the output rectifier caused by the switching current, wherein the first inductor and the first capacitor are individual components, and the first resistor includes a first internal resistance of the first inductor.

* * * * *